(12) United States Patent
Palihapitiya et al.

(10) Patent No.: US 9,626,692 B2
(45) Date of Patent: Apr. 18, 2017

(54) ON-LINE ADVERTISING WITH SOCIAL PAY

(71) Applicants: Chamath Palihapitiya, Palo Alto, CA (US); Mary Graham, San Francisco, CA (US)

(72) Inventors: Chamath Palihapitiya, Palo Alto, CA (US); Mary Graham, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/647,275

(22) Filed: Oct. 8, 2012

(65) Prior Publication Data
US 2014/0100943 A1    Apr. 10, 2014

(51) Int. Cl.
*G06Q 30/02* (2012.01)
*G06Q 50/00* (2012.01)

(52) U.S. Cl.
CPC ..... *G06Q 30/0251* (2013.01); *G06Q 30/0281* (2013.01); *G06Q 50/01* (2013.01)

(58) Field of Classification Search
CPC .......... G06Q 30/0274; G06Q 30/0273; G06Q 30/0214
USPC ..................................................... 705/14.39
See application file for complete search history.

(56) References Cited

U.S. PATENT DOCUMENTS

| | | | |
|---|---|---|---|
| 5,794,210 A * | 8/1998 | Goldhaber et al. ........ | 705/14.69 |
| 2002/0023003 A1* | 2/2002 | Raheman ........... | G06Q 30/0258 |
| | | | 705/14.56 |
| 2010/0324990 A1* | 12/2010 | D'Angelo .............. | G06Q 10/10 |
| | | | 705/14.46 |
| 2011/0184792 A1* | 7/2011 | Butcher ................ | G06Q 10/10 |
| | | | 705/14.13 |
| 2011/0258026 A1* | 10/2011 | Prince ................... | G06Q 30/02 |
| | | | 705/14.16 |
| 2011/0258042 A1* | 10/2011 | Purvy ................... | G06Q 30/02 |
| | | | 705/14.49 |
| 2012/0036003 A1 | 2/2012 | Tong | |

FOREIGN PATENT DOCUMENTS

| | | |
|---|---|---|
| KR | 10-1061952 B1 | 9/2011 |
| KR | 10-2012-0087211 A | 8/2012 |
| TW | 201229941 | 7/2012 |
| TW | 201229944 | 7/2012 |

OTHER PUBLICATIONS

International Search Report and Written Opinion for International Application PCT/US2013/061820, Jan. 28, 2014.
TW Office Action for Patent Application No. 102136116 (with English translation), Dec. 8, 2016.

* cited by examiner

*Primary Examiner* — David Stoltenberg
*Assistant Examiner* — Robert C Johnson
(74) *Attorney, Agent, or Firm* — Baker Botts L.L.P.

(57) ABSTRACT

In one embodiment, a method includes receiving an indication of a reward-generating event associated with an advertisement. The reward-generating event includes an action by a user in response to the advertisement being presented to the user. The method also includes determining based at least in part on the action by the user a reward to allocate to the user for the reward-generating event.

17 Claims, 6 Drawing Sheets

ON-LINE ADVERTISING WITH SOCIAL PAY

TECHNICAL FIELD

This disclosure generally relates to social-networking systems.

BACKGROUND

A social network, in general, is a social structure made up of entities, such as individuals or organizations that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking web sites. A social-networking system, such as a social-networking web site, enables its users to interact with it and with each other through the system.

SUMMARY

Particular embodiments may incentivize users to certain actions that are beneficial to a social-networking system, to carriers, or to the advertisers. For example, user actions that may be incentivized include clicking an advertisement delivered to the user, using a Wi-Fi connection instead of a wireless telecommunication service, or providing information about the user or other information that the social-networking system may add to a social graph of the social-networking system. For example, a social-networking system may pay (or provide another reward to) a user for clicking an advertisement delivered to the user. In addition or as an alternative, the carrier or social-networking system may pay (or provide another reward to) the user for using a Wi-Fi connection for data that is delivered to the user. Particular embodiments may also incentivize carriers providing network connectivity to users to facilitate the delivery of and user interaction with advertisements. For example, the social-networking system may pay (or provide another reward to) a carrier for facilitating the delivery of the advertisement to the user and interaction by the user with the advertisement through the network connectivity provided by the carrier. The payments to the user and carrier described above may come from a portion of a bid for the advertisement placed by the advertiser. In another embodiment, the payments may be calculated based on a reward-generating policy (e.g. rules) which specify actions or action types, the associated reward, and the associated recipient. The user may use the payment (or other reward) to pay down a cellular-telephone bill of the user, put it into a wallet, use it to play games. The payment or other reward may take any suitable form, such as, for example, credits with the social-networking system, credits with the carrier, game credits, free minutes on a telephone plan, free data usage on a data-carrier plan, or money.

DESCRIPTION OF EXAMPLE EMBODIMENTS

Figure 1:
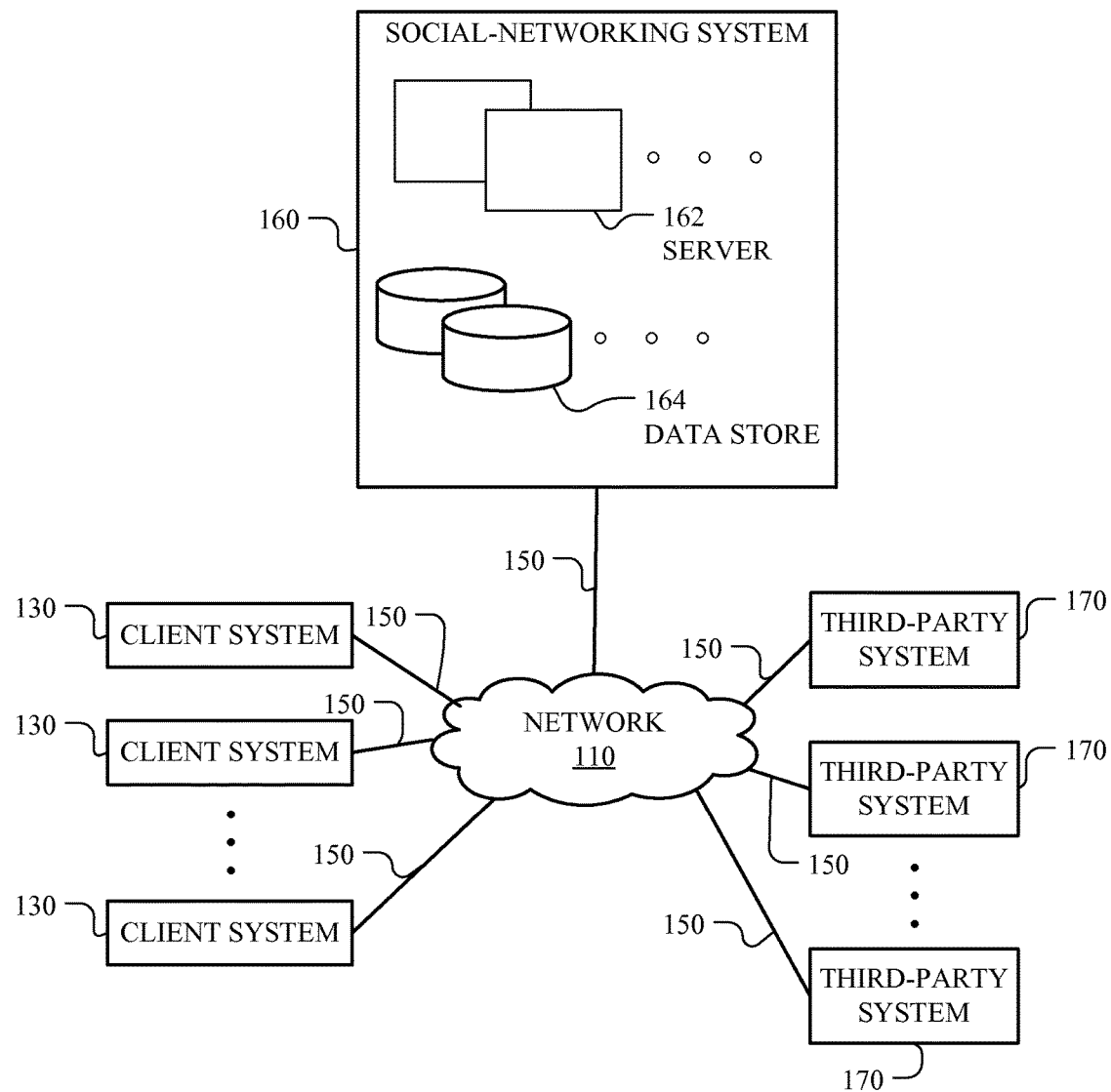
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, a carrier operates or provides one or more portions of network 110; one or more portions of one or more links 150; or access to one or more portions of network 110 or one or more portions of one or more links 150. As an example and not by way of limitation, a wireless service provider, cellular or other telephone company, multiple system operator (MSO), or Internet service provider (ISP) may be a carrier, where appropriate. As another example, an entity operating or providing a wireless access point (such as an Institute of Electrical and Electronics Engineers (IEEE) 802.11 wireless router) for a space (such as a residence or coffee house) may be a carrier. A user of a client system 130 may have an account or a subscription with a carrier. Although this disclosure describes or illustrates particular carriers, this disclosure contemplates any suitable carrier.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

Client system 130 may display advertisements through an application, such as for example a web browser, messaging client, or other suitable application. In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user). In addition or as an alternative, an advertisement may be one or more sponsored stories (e.g. a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes by, for example, having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events. A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. us 2012/0203831, entitled "Sponsored Stories Unit Creation from Organic Activity Stream" and filed 3 Feb. 2012 as U.S. patent application Ser. No. 13/020,745, or U.S. Patent Application Publication No. us 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

Although this disclosure describes or illustrates particular advertisements delivered in particular ways, this disclosure contemplates any suitable advertisements delivered in any suitable manner. A contextual advertisement may be displayed on a search-engine-results webpage, banner advertisements may be displayed on a suitable webpage, interstitial advertisements may appear before or after an expected webpage, or electronic messages (such as e-mail) may include advertisements. In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g. through social-networking system 160) or RSVP (e.g. through social-networking system 160) to an event associated with the advertisement. In addition or as an alternative, an advertisement may include social-networking-system context directed to the user. For example, an advertisement may display information about a friend of the user within social-networking system 160 who has taken an action associated with the subject matter of the advertisement.

Social-networking-system functionality or context may be associated with an advertisement in any suitable manner. For example, an advertising system (which may include hardware, software, or both for receiving bids for advertisements and selecting advertisements in response) may retrieve social-networking functionality or context from social-networking system 160 and incorporate the retrieved social-networking functionality or context into the advertisement before serving the advertisement to a user. Examples of selecting and providing social-networking-system functionality or context with an advertisement are disclosed in U.S. Patent Application Publication No. US 2012/0084160, entitled "Providing Social Endorsements with Online Advertising" and filed 5 Oct. 2010 as U.S. patent application Ser. No. 12/898,662, and in U.S. Patent Application Publication No. US 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or context may cause information about the interaction to be displayed in a profile page of the user in social-networking-system 160.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertisement server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g. third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Advertisers may be incentivized to deliver their advertisements to users that are more likely to find them more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g. "Who is viewing now or has viewed recently the page for COCA-COLA?"); light-weight connections (e.g. "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. US 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. US 2009/0070219, entitled "Targeting Advertisements in a Social Network" and filed 20 Aug. 2008 as U.S. patent application Ser. No. 12/195,321; U.S. Patent Application Publication No. US 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. US 2012/0166532, entitled "Contextually Relevant Affinity Prediction in a Social-Networking System" and filed 23 Dec. 2010 as U.S. patent application Ser. No. 12/978,265.

Particular embodiments may incentivize users to perform actions with respect to advertisements delivered to them that are beneficial to social-networking system 160, to carriers facilitating the delivery of the advertisements, or to the advertisers. For example, a user may be incentivized to click an advertisement delivered to the user, use a Wi-Fi connection (provided by a carrier), or provide information about the user or other information that social-networking system 160 may add to a social graph of social-networking system 160. For example, social-networking system 160 may pay (or provide another reward to) a user for clicking an advertisement delivered to the user. In addition or as an alternative, the carrier or social-networking system 160 may pay (or provide another reward to) the user for using a Wi-Fi connection provided by the carrier to interact with the advertisement or take subsequent actions in connection with the advertisement being delivered to the user. Particular embodiments may also incentivize carriers providing network connectivity to users to facilitate the delivery of and user interaction with advertisements. For example, social-networking system 160 may pay (or provide another reward to) a carrier for facilitating the delivery of the advertisement to the user and interaction by the user with the advertisement through the network connectivity provided by the carrier. The payments to the user and carrier described above may come from a portion of a bid for the advertisement placed by the advertiser. The user may use the payment (or other reward) to pay down a cellular-telephone bill of the user, put it into a wallet, use it to play games. The payment or other reward may take any suitable form, such as, for example, credits with the social-networking system, credits with the carrier, game credits, free minutes on a telephone plan, free data usage on a data-carrier plan, or money. The payment or other reward to the user or the carrier may come from a portion of a bid for the advertisement placed by the advertiser (as described below). Although this disclosure describes and illustrates particular incentives to particular entities, this disclosure contemplates any suitable incentives to any suitable entities.

Figure 2:
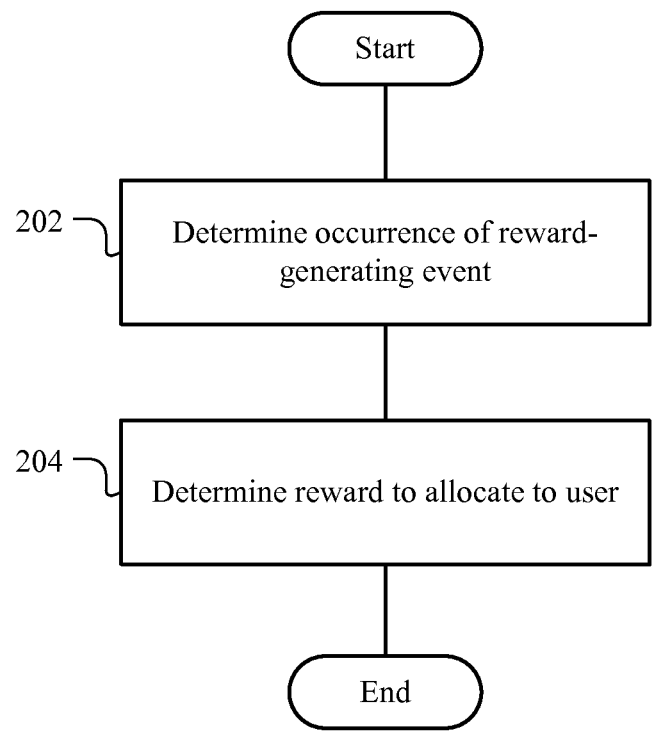
FIG. 2 illustrates an example method for allocating a bid for an advertisement between a user and social-networking system.

FIG. 2 illustrates an example method for determining a reward amount for a user. The method may begin at step 202, where the occurrence of a reward-generating event is determined. For example, social-networking system 160 may search an event log (as described below) of reward-generating events (as described below) that match rules (e.g. reward-generating policies) defined by social-networking system 160, one or more other entities (such as a carrier or advertiser), or any suitable combination of these. The rules may specify the circumstances under which a user may receive a reward. The circumstances may include more reward-generating events (as described below). For example, the reward-generating events may be certain actions taken by a user either on or off the social-networking system 160.

At step 204, a reward to allocate to the user is determined, at which point the method may end. The reward to allocate to the user may include social-networking system 160 paying the user for providing social-graph information (e.g. the location of a school is located or a review or ranking of a restaurant) in connection with the reward-generating event. The rule may set out a reward value and various criteria, when fulfilled, trigger a reward payment. The criteria may specify a recipient (e.g. a user of the social networking system 160) and action(s). For example, the reward to allocate to the user may be determined according to a rule that specifies that the user is to receive a per-minute value for using a Wi-Fi connection instead of a cellular-telephone connection. The per-minute value may be added to the user's service plan with the carrier.

In addition or as an alternative, the reward to allocate to the user may include an allocation of a portion of a bid amount of a bid for an advertisement associated with the reward-generating event. For example, a carrier that facilitated the reward-generating event (for example by providing one or more network connections that enabled the user to interact with an advertisement). Particular embodiments may repeat one or more steps of the method of FIG. 2, where appropriate. Particular embodiments may incorporate one or more suitable steps of the methods of FIGS. 3-4 or the call flow of FIG. 5. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
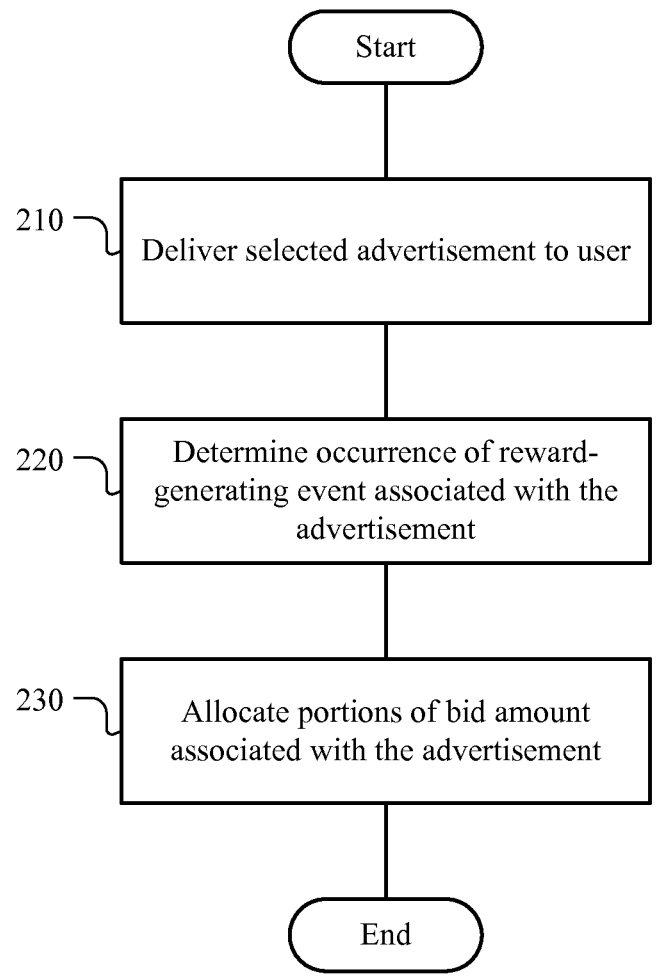
FIG. 3 illustrates an example method for allocating a bid for an advertisement among a user, carrier, and social-networking system.

FIG. 3 illustrates an example method for allocating a bid for an advertisement, where the allocation is among a user, carrier, and social-networking system 160. The method may begin at step 210, where an advertisement is delivered to a user. An advertiser may have bid to have the advertisement delivered to the user, and social-networking system 160 may have selected the advertisement for delivery to the user. The bid for the advertisement may specify the advertisement, one or more criteria for the advertisement, and a bid amount (which may be a dollar or other monetary amount). The criteria for the advertisement may describe the advertising space (which may be a portion of a web page) that the advertiser wants the advertisement presented in; describe one or more characteristics of the user (such as demographics, social information, or context) that the advertiser wants the advertisement presented to; specify when the advertiser wants the advertisement presented; specify exclusions of or limitations on competing advertisements from concurrent presentation with the advertisement; or provide other suitable criteria for the advertisement. Although this disclosure describes or illustrates particular criteria for particular advertisements, this disclosure contemplates any suitable criteria for any suitable advertisements.

The bid amount may be a dollar or other monetary amount that the advertiser is willing to pay to have the advertisement delivered, to have the advertisement clicked, or for actions linked to the advertisement (such as purchases or form submissions). The advertiser may pay for the advertisement based on a cost per impression (CPI) or cost per 1000 impressions (CPM) pricing model, a pay per click (PPC) pricing model, or a cost per action (CPA) or pay per action (PPA) pricing model. Herein, reference to a bid may be a reference to a bid amount (as opposed to the advertisement or criteria for the advertisement specified by the bid), where appropriate.

A bid amount may include an advertisement bid component and a social-pay bid component. The advertisement bid component may be a first monetary amount that the advertiser is willing to pay to a publisher for the advertisement. A publisher may be an entity that hosts or operates advertising spaces, sells them to advertisers, and presents the advertisements of those advertisers in those advertising spaces. For example, a publisher may be a host (such as social-networking system 160 or a third-party system 170) of a web page that an advertisement is presented on or otherwise provide a means for delivering the advertisement to users. For example, an advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. US 2012/0159635, entitled "Comment Plug-In for Third-Party System" and filed 15 Dec. 2010 as U.S. patent application Ser. No. 12/969,368; U.S. Patent Application Publication No. US 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Patent Application Publication No. US 2008/0040475, entitled "Providing a News Feed Based on User Affinity in a Social Network Environment" and filed 11 Aug. 2006 as U.S. patent application Ser. No. 11/503,093; U.S. Patent Application Publication No. US 2012/0072428, entitled "Action Clustering for News Feeds" and filed 16 Sep. 2010 as U.S. patent application Ser. No. 12/884,010; U.S. Patent Application Publication No. US 2001/0004692, entitled "Gathering Information about Connections in a Social Networking Service" and filed 1 Jul. 2009 as U.S. patent application Ser. No. 12/496,606; U.S. Patent Application Publication No. US 2008/0065701, entitled "Method and System for Tracking Changes to User Content in an Online Social Network" and filed 12 Sep. 2006 as U.S. patent application Ser. No. 11/531,154; U.S. Patent Application Publication No. US 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. US 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. US 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content. The social-pay bid component may be a second monetary amount that the advertiser is willing to pay a user, carrier, or both for a reward-generating event associated with the advertisement (as described below). In addition or as an alternative, the value to the user may be determined based on a kick back provided to the user for a reward-generating event, whatever the reward may be.

The advertisement may be selected for delivery to the user based at least in part on an ad-score for the advertisement that is associated with the user. Social-networking system 160 may provide ad-scores for advertisements. Advertisements with higher ad-scores may generate more advertising revenue for social-networking system 160 (as a publisher of the advertisements), which social-networking system 160 may share with users, carriers, or both. An ad-score for an advertisement may be based on user location, social-graph connections or other social-graph information, or other suitable factors. In addition or as an alternative, an ad-score for an advertisement may be based on the bid amount for the advertisement and a probability that a user will select (e.g. click) the advertisement as presented. In addition or as a further alternative, the ad-score may be based on a quality score, the bid amount for the advertisement, and user-profile or other information associated with the user. For example, the value AdScore may be calculated using the equation $AdScore = W_1 Quality + W_2 Bid + W_3 ValueToUser$. Although a particular mathematical expression is shown, AdScore may be calculated using any suitable mathematical expressions including any suitable mathematical functions.

In the equation above, $W_1$, $W_2$, and $W_3$ may be weight variables. Quality may be a quality score calculated for each advertisement. The quality score may represent a correlation between the advertisement that is being presented and a web page (or one or more attributes of the web page) that the advertisement is being presented on. In addition or as an alternative, the quality score may represent an observed click-through rate for the advertisement. In addition or as another alternative, the quality score may represent a dynamic fit between the advertisement and user-profile information associated with a user that the advertisement would be presented to. Bid may be the bid amount for the advertisement (which as discussed above may include an advertisement bid component and a social-pay bid component). ValueToUser (which may be affected by the social-pay bid component of the bid for the advertisement) may be a value associated with user-profile or other information associated with the user that the advertisement would be presented to, including a current context of the user. A current context of a user may include the user's current location, the user's current relationship to one or more other users (such as for example a physical proximity of the user to one or more other users), or current sensor data from one or more sensors on a client system 130 of the user. In addition or as an alternative, a current context of a user may include one or more weather inputs (which may indicate the current weather conditions the user is experiencing), how the user is interacting with a client system 130, other computing device, or software or services associated with, for example, social-networking system 160 or a third-party system 170, or other current context of the user. An advertisement that is more relevant to a current context of a user may be more relevant, interesting, or valuable to the user. In addition or as an alternative, particular embodiments may use one or more systems or methods for bidding on or delivering advertisements disclosed in U.S. patent application Ser. No. 13/294,052, entitled "Multi-Dimensional Advertisement Bidding" and filed 10 Nov. 2011, which is incorporated herein by reference as an example and not by way of limitation.

When selecting among multiple advertisements for delivery to a user, social-networking system 160 may select the advertisement with the highest ad-score. When selected, the advertisement may be delivered to the user, for example, as text (which may be HTML-linked), as one or more images (which may be HTML-linked), as one or more videos, as audio, as one or more ADOBE FLASH files, as a suitable combination of these, or as any other suitable advertisement in any suitable digital format on a web page of social-networking system 160 or a third-party system 170 accessed by the user on client system 130. In addition or as an alternative, the advertisement may be delivered to an application on client system 130 for the application to present to the user. For example, the advertisement may be delivered to a FACEBOOK MOBILE application on client system 130 to be presented to the user in a graphical user interface (GUI) of the application. The advertisement may be stored at social-networking system 160 or a third-party system 170 and may be delivered to the user in a push or pull communication with client system 130. As an example, the advertisement may be a sponsored story in a news feed that social-networking system 160 provides to the user. Social-networking system 160 may deliver the sponsored story to the user in a notification pushed by social-networking system 160 to client system 130. Client system 130 may present the sponsored story to the user in a news feed of social-networking system 160. As another example, the advertisement may be a sponsored story in a ticker that social-networking system 160 provides to the user. Social-networking system 160 may deliver the sponsored story to the user in a communication sent by social-networking system 160 to client system 130 in response to a request (a "pull") from client system 130. Client system 130 may present the sponsored story to the user in a ticker of social-networking system 160.

At step 220, social-networking system 160 determines the occurrence of a reward-generating event associated with the advertisement. A reward-generating event may include an impression, click, click-through, or other suitable user interaction with the advertisement and may occur at least in part on client system 130, social-networking system 160, third-party system 170, or a suitable combination of these. Although this disclosure describes and illustrates particular reward-generating events, this disclosure contemplates any suitable reward-generating events.

As an example of a reward-generating event, consider a user at a client system 130 navigating a web site of social-networking system 160. A carrier provides network connectivity to client system 130 facilitating navigation of the web site by the user. The user may request a web page of the web site, and social-networking system 160 may select an advertisement for presentation on the web page to the user. As discussed above, the advertisement may be selected based on an ad-score for the advertisement that is associated with the user. The web page may be served with the advertisement to client system 130 for presentation to the user. All or a portion of the web page and the advertisement may be served through the network connectivity provided by the carrier. When presented with the web page with the advertisement, the user may view and click the advertisement. In response, client system 130 may be directed to a landing page for the advertisement, which may be hosted by a third-party system 170. The user may then purchase a widget at the landing page or another web page associated with the landing page. The impression of the advertisement, the user clicking on it, or the purchase by the user may individually or collectively be a reward-generating event. After the purchase, third-party system 170 may generate a reward-generating-event message and send it to social-networking system 160. The reward-generating-event message may identify the advertisement, the bid for the advertisement, the carrier, third-party system 170, client system 130, the user, or the type of action that occurred. Social-networking system 160 may determine whether the user is a member of social-networking system 160 and, if so, then store information about the reward-generating event in a reward-generating-event log maintained by social-networking system 160. Social-networking system 160 may determine whether the user is a member of social-networking system 160 without sharing any of personal information of the user or requiring the user to log on to social-networking system 160, and the information about the reward-generating event stored by social-networking system 160 may include all or some of the information in the reward-generating-event message. Although this disclosure describes a particular scenario with a particular reward-generating event, this disclosure contemplates any suitable scenario with any suitable reward-generating event. As an example, an impression may by itself (e.g. without a user clicking the advertisement) constitute a reward-generating event. As another example, a notification pushed to a client system 130 may constitute a reward-generating event.

At step 230, social-networking system 160 allocates the bid amount associated with the advertisement (including the advertisement bid component and the social-pay bid component) among itself, the user, and the carrier, at which point the method may end. As described above, the advertisement bid component may be a first monetary amount that the advertiser is willing to pay to a publisher for the advertisement, which in this case is social-networking system 160, and the social-pay bid component may be a second monetary amount that the advertiser is willing to pay the user, carrier, or both for the reward-generating event. The value to the user may be determined based on a kick back provided to the user for a reward-generating event, whatever the reward may be. Social-networking system 160 may allocate the advertisement bid component to itself as the publisher. Social-networking system 160 may also allocate the social-pay bid component to itself. As an alternative, social-networking system 160 may allocate a portion of the social-pay bid component (e.g. 50% of it) to the user and another portion of the social-pay bid component (the remaining 50% of it) to the carrier. As another alternative, social-networking system 160 may allocate all of the social-pay bid component to the user or all of the social-pay bid component to the carrier. The value to the user may be determined based on a kick back provided to the user for a reward-generating event, whatever the reward may be. As yet another alternative, social-networking system 160 may refund all or a portion of the social-pay bid component to the advertiser. All though this disclosure describes or illustrates particular allocations of a particular bid amount associated with a particular advertisement, this disclosure contemplates any suitable allocations of any suitable bid amounts associated with any suitable advertisements.

The amount allocated to the user or carrier may be specified at least in part by the bid for the advertisement, by an agreement between social-networking system 160 and the user (such as the terms of use of social-networking system 160), by an agreement between social-networking system 160 and the advertiser (other than the bid), by an agreement between social-networking system 160 and the carrier, by another suitable source, or by a suitable combination of these. As an example, the bid for the advertisement may specify in connection with the social-pay bid component that $0.10 is to be paid to the user for the reward-generating event and that $0.01 is to be paid to the carrier for the reward-generating event. Social-networking system 160 may allocate the social-pay bid component accordingly. The value to the user may be determined based on a kick back provided to the user for a reward-generating event, whatever the reward may be. As another example, the bid for the advertisement may specify in connection with the social-pay bid component that $0.10 is to be allocated between the user and carrier for the reward-generating event, with the allocation to be determined by social-networking system 160. Social-networking system 160 may have an agreement with the user specifying that social-networking system 160 shall pay the user 90% of any social-pay component for any reward-generating event associated with the user (e.g. caused by the user). Social-networking system 160 may have an agreement with the carrier specifying that social-networking system 160 shall pay the carrier 10% of any social-pay component for a reward-generating event associated with the carrier (e.g. that the carrier facilitates by network connectivity provided by it). Accordingly, social-networking system 160 may allocate $0.09 of the social-pay bid component to the user and $0.01 of the social-pay bid component to the carrier. The value to the user may be determined based on a kick back provided to the user for a reward-generating event, whatever the reward may be.

Moreover, the amounts (or relative percentages of the amounts) allocated to the user or carrier may be determined at least in part based on the action(s) constituting the reward-generating event. As an example, if the reward-generating event is only an impression of the advertisement, social-networking system 160 may keep the social-pay bid component and not allocate any of it to the user of carrier. As another example, if the reward-generating event is a selection of the advertisement by the user (e.g. the user clicks the advertisement after being presented with it), but the user does not perform any action at a landing page following the selection of the advertisement (e.g. making a purchase or filling out and submitting a form), social-networking system 160 may allocate 50% of the social-pay bid component to the user and keep the rest, without allocating any of the social-pay bid component to the carrier. The value to the user may be determined based on a kick back provided to the user for a reward-generating event, whatever the reward may be. As yet another example, if the reward-generating event is an action following a selection of the advertisement by the user (e.g. the user clicks the advertisement after being presented with it, navigates to a landing page, and then makes a purchase at the landing page), social-networking system 160 may allocate 90% of the social-pay bid component to the user and 10% of the social-pay bid component to the carrier. Although this disclosure describes or illustrates particular amounts allocated to the user or carrier being specified by or determined based on particular sources or factors, this disclosure contemplates any suitable amounts allocated to the user or carrier being specified by or determined based on any suitable sources or factors.

Social-networking system 160 may allocate the bid amount among itself, the user, and the carrier as a way of sharing advertising revenue, and allocations of bid amounts may occur in batches or in real-time, where appropriate. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
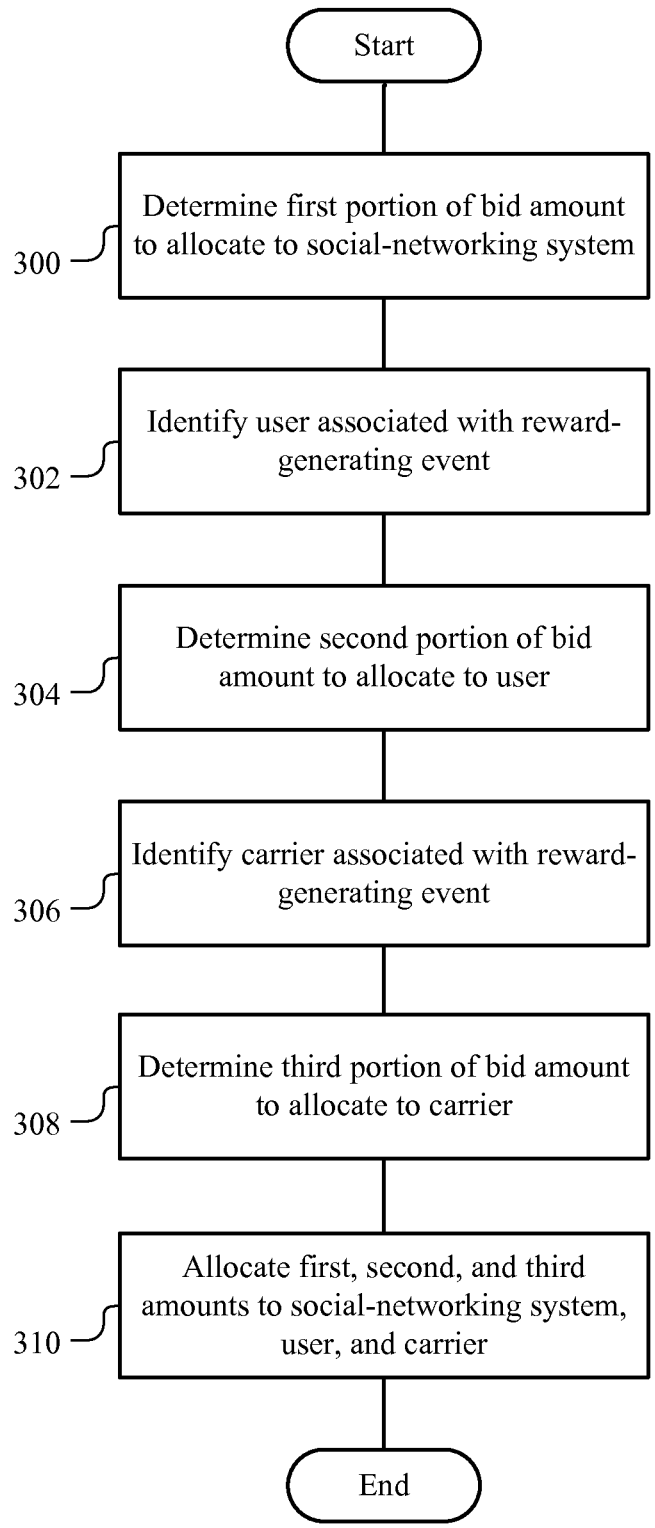
FIG. 4 illustrates an example method for allocating a bid for an advertisement among a user, carrier, and social-networking system.

FIG. 4 illustrates another example method for allocating a bid for an advertisement among a user, carrier, and social-networking system 160. The method of FIG. 4 may correspond to step 230 of FIG. 3 in particular embodiments. The method of FIG. 4 may begin at step 300, where social-networking system 160 determines a first portion of a bid amount for an advertisement to be allocated to social-networking system 160. As described and illustrated with respect to FIG. 3, an advertiser may have bid to have the advertisement delivered to the user (which bid may have specified the bid amount for the advertisement); social-networking system 160 may have selected the advertisement for delivery to the user; a reward-generating event associated with the event may have occurred (e.g. an impression, click, click-through, or other suitable user interaction with the advertisement); a reward-generating-event message may have been sent to or within social-networking system 160; and social-networking system 160 may have stored information about the reward-generating event (from the reward-generating-event message) in a reward-generating-event log maintained by social-networking system 160.

At step 300, to determine the first portion of the bid amount, particular embodiments may analyze the entry of the reward-generating event in the event log. For example, the entry of the reward-generating event in the event log may indicate the advertisement bid component and social-networking system 160 may allocate the advertisement bid component to itself, as described above. At step 302, social-networking system 160 identifies the user associated with the reward-generating event. To do this, particular embodiments may analyze the entry of the reward-generating event in the event log. For example, the entry of the reward-generating event in the event log may identify the user associated with the reward-generating event, as described above.

At step 304, social-networking system 160 determines a second portion of the bid amount for the advertisement to be allocated to the user. To do this, particular embodiments may analyze the entry of the reward-generating event in the event log, along with other relevant information maintained by social-networking system. For example, the entry of the reward-generating event in the event log may indicate the social-pay bid component of the bid amount for the advertisement and the type of action that constituted the reward-generating event. In addition, data stores 164 of social-networking system 160 may include information about an agreement between social-networking system 160 and the user (such as the terms of use of social-networking system 160), by an agreement between social-networking system 160 and the advertiser (other than the bid), by an agreement between social-networking system 160 and the carrier, by another suitable source, or by a suitable combination of these. Social-networking system 160 may use all or some of this information to determine the second portion of the bid amount, as described above. In particular embodiments, social-networking system 160 may allocate the second portion to the user as a numeric or other value of a point system that a user may later use towards goods, services, or as legal tender. In such embodiments, the user may redeem the second portion along with other such points collected by the user second portion, along with other points collected by the user, may be redeemable by the user through social network system 160.

At step 306, social-networking system 160 identifies a carrier associated with the reward-generating event (which may be the carrier that provided the network connectivity to client system 130 of the user facilitating the reward-generating event). To do this, particular embodiments may analyze the entry of the reward-generating event in the event log. For example, the entry of the reward-generating event in the event log may identify the carrier associated with the reward-generating event, as described above.

At step 308, social-networking system 160 determines a third portion of the bid amount for the advertisement to be allocated to the carrier. To do this, particular embodiments may analyze the entry of the reward-generating event in the event log, along with other relevant information maintained by social-networking system. For example, the entry of the reward-generating event in the event log may indicate the social-pay bid component of the bid amount for the advertisement and the type of action that constituted the reward-generating event. In addition, data stores 164 of social-networking system 160 may include information about an agreement between social-networking system 160 and the user (such as the terms of use of social-networking system 160), by an agreement between social-networking system 160 and the advertiser (other than the bid), by an agreement between social-networking system 160 and the carrier, by another suitable source, or by a suitable combination of these. Social-networking system 160 may use all or some of this information to determine the third portion of the bid amount, as described above.

At step 310, the first, second, and third portions of the bid amount are allocated to social-networking system 160, the user, and the carrier, at which point the method may end. In particular embodiments, allocation of the first, second, and third portions of the bid amount occurs in batches or in real time. Social-networking system 160 may notify the user or carrier when allocating the second or third portions, and social-networking system 160 may allocate the first, second, and third portions among itself, the user, and the carrier in batches or in real-time, where appropriate.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
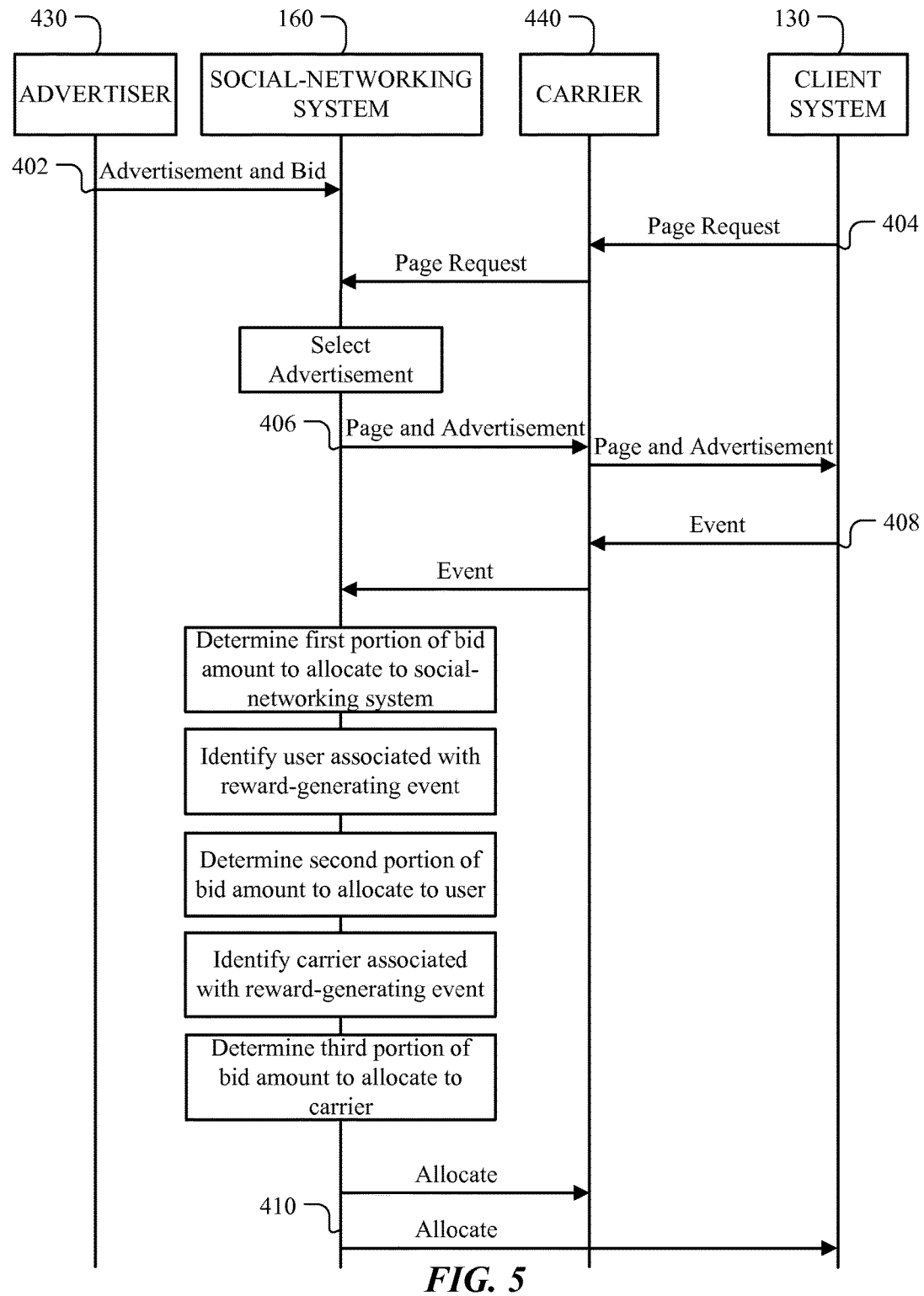
FIG. 5 illustrates an example call flow for allocating a bid for an advertisement among a user, carrier, and social-networking system.

FIG. 5 illustrates an example call flow for allocating a bid for an advertisement among a user at a client system 130, carrier 440, and social-networking system 160. At call 402, advertiser 430 sends a bid for an advertisement to social-networking system 160. As described above, the bid for the advertisement may specify the advertisement, one or more criteria for the advertisement, and a bid amount (which may include an advertisement bid component and a social-pay bid component). The advertisement as specified may be a file or document that includes the advertisement or a tag that references a location of the advertisement on one or more servers, for example, of a third-party system 170. Social-networking system 160 may store the bid for delivery to a user at a later time. At call 404, a user at client system 130 requests, through network connectivity provided by carrier 440, a web page from social-networking system 160. The request may be an HTTP request and may be sent to a URL within a domain of social-networking system 160. In response to the request, social-networking system 160 selects an advertisement to deliver with the web page to the user at client system 130. As described above, social-networking system 160 may select the advertisement based on an ad-score for the advertisement that is associated with the user. Social-networking system 160 may calculate the ad-score during or before the selection process, according to particular needs. At call 406, social-networking system 160 sends, through network connectivity provided by carrier 440, the web page with the advertisement to the user at client system 130. The web page may be sent as one or more HTML files responsive to the HTTP request, and client system 130 may render the web page based on the HTML files. The HTML files may include the advertisement or information identifying the source of the advertisement (such as a Uniform Resource Identifier for the), where client system 130 can retrieve the advertisement for rendering along with the web page.

At call 408, a reward-generating event associated with the advertisement occurs and social-networking system 160 receives information about the reward-generating event. For example, when presented with the web page with the advertisement, the user may view and click the advertisement. In response, client system 130 may be directed to a landing page for the advertisement. The user clicking the advertisement may constitute the reward-generating event, and social-networking system 160 may store information about the reward-generating event in a reward-generating-event log. The information stored may identify the advertisement, the bid for the advertisement, carrier 440, client system 130, the user, or the type of action that occurred. After receiving information about the reward-generating event, social-networking system 160 may identify the user and carrier 440 and determine a first, second, and third portion of the bid amount for the advertisement (including the advertisement bid component and the social-pay bid component) to allocate to each of social-networking system 160, the user, and carrier 440. This may be done as described above with respect to FIGS. 2 and 3. At call 410, social-networking system 160 may distribute the amounts allocated to the user and carrier 440.

Particular embodiments may repeat one or more calls or steps of the call flow of FIG. 5, where appropriate. Although this disclosure describes and illustrates particular calls or steps as occurring in a particular order, this disclosure contemplates any suitable calls or steps of the call flow of FIG. 5 occurring in any suitable order. Moreover, although this disclosure describes and illustrates particular components, devices, or systems performing particular calls or carrying out particular steps of the call flow of FIG. 5, this disclosure contemplates any suitable combination of any suitable components, devices, or systems performing any suitable calls or carrying out any suitable steps of the call flow of FIG. 5.

Figure 6:
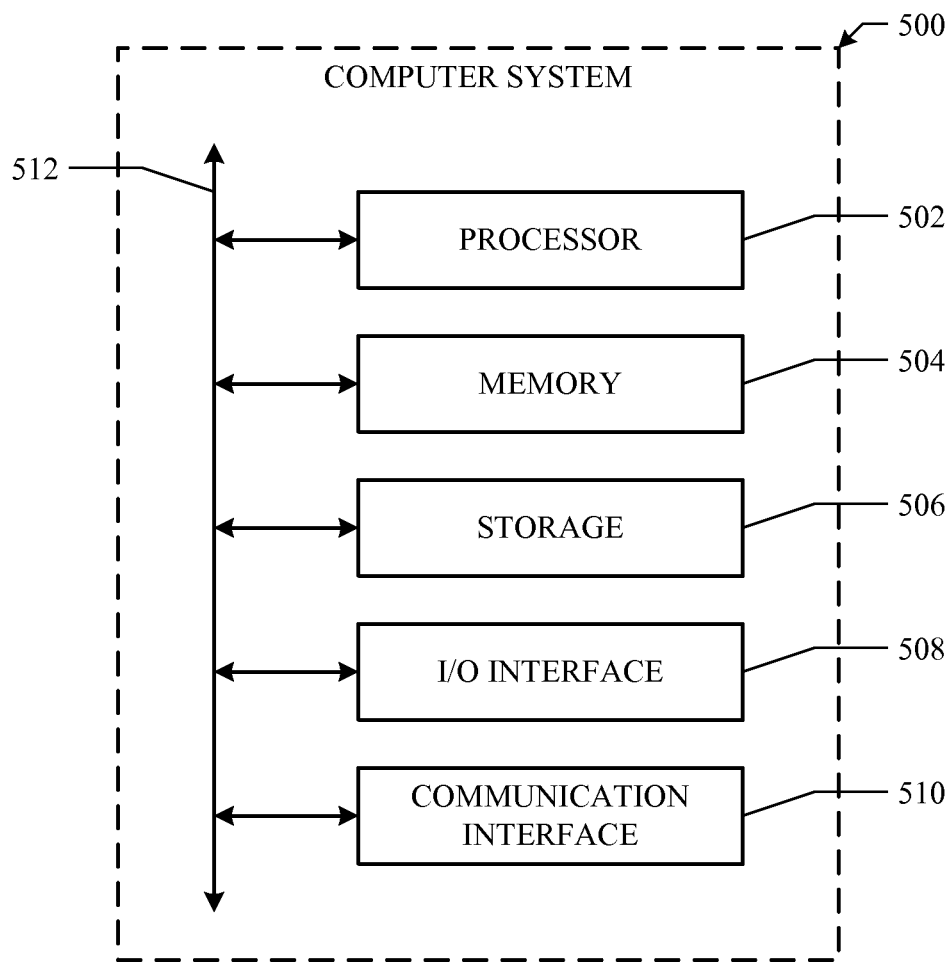
FIG. 6 illustrates an example computer system.

FIG. 6 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a server of a social-networking system:
   receiving, from a client system of a first user of the social-networking system, an indication of a reward-generating event, wherein the reward-generating event comprises the first user liking, sharing, commenting on, or posting a content object via an interface associated with the social-networking system;
   updating, by the server of the social-networking system, a social graph of the social-networking system based on the reward-generating event, wherein the social graph comprises a plurality of nodes and a plurality of edges connecting the nodes, each node corresponding to a user or content object associated with the social-networking system, wherein the first user corresponds to a first node of the plurality of nodes, and wherein updating the social graph comprises one or more of:
      adding a new node to the social graph corresponding to a content object posted by the first user; or
      adding an edge connecting the first node to a second node of the plurality of nodes corresponding to the content object liked, shared, or commented on by the first user;
   searching, by the server of the social-networking system, an event log of reward-generating events stored on the server to determine whether the update to the social graph matches a reward-generating rule defined by the social-networking system;
   responsive to determining that the update to the social graph based on the reward-generating event performed by the first user matches the reward-generating rule, allocating, by the server of the social-networking system, a reward to an account associated with the first user, wherein the reward is calculated based on the reward-generating rule; and
   responsive to determining that the update to the social graph based on the reward-generating event performed by the first user matches the reward-generating rule, sending, to the client system of the first user, a selected advertisement for presentation to the first user, the selection of the advertisement being based at least in part on a quality score for the advertisement, wherein the quality score for the advertisement is calculated based on a value associated with the update to the social graph.

2. The method of claim 1, further comprising:
   selecting, by the server of the social-networking system, the advertisement for presentation to the first user further based at least in part on a bid for the advertisement by an advertiser, wherein:
   the advertisement is associated with the provision of the information to the social-networking system;
   the bid comprises a social-pay bid component comprising a value that the advertiser is willing to pay to the first user for the reward-generating event; and
   determining the reward to allocate to the first user for the reward-generating event comprises determining based at least in part on the action by the first user a portion of the social-pay bid component to allocate to the first user for the reward-generating event.

3. The method of claim 2, wherein:
the social-pay bid component further comprises a value that the advertiser is willing to pay to a carrier associated with the reward-generating event for the reward-generating event; and
the method further comprises determining, by the server of the social-networking system, based at least in part on the action by the first user a portion of the social-pay bid component to allocate to the carrier for the reward-generating event.

4. The method of claim 2, wherein:
the bid further comprises an advertisement bid component comprising a value that the advertiser is willing to pay to a publisher of the advertisement for the reward-generating event; and
the method further comprises determining, by the server of the social-networking system, based at least in part on the action by the first user a portion of the advertisement bid component to allocate to the publisher.

5. The method of claim 4, wherein all of the advertisement bid component is allocated to the publisher.

6. The method of claim 2, further comprising determining, by the server of the social-networking system, based at least in part on the reward-generating event, a portion of the social-pay bid component to allocate to another entity.

7. The method of claim 6, wherein the other entity was involved in the selection of the advertisement for presentation to the first user.

8. The method of claim 7, wherein the other entity is an operator of a social-networking system.

9. The method of claim 2, wherein the selection of the advertisement for presentation to the first user was further based at least in part on:
a location associated with the first user;
social-graph information associated with the first user; or
a quality score of the advertisement.

10. The method of claim 1, wherein the reward-generating event further comprises one or more of:
an impression of the advertisement;
a click of the advertisement;
a click-through of the advertisement;
a conversion of the advertisement; or
using a Wi-Fi connection in connections with the advertisement.

11. One or more computer-readable non-transitory storage media embodying software that is operable when executed by a server of a social-networking system to:
receive, from a client system of a first user of the social networking system, an indication of a reward-generating event, wherein the reward-generating event comprises the first user liking, sharing, commenting on, or posting a content object via an interface associated with the social-networking system;
update, by the server of the social-networking system, a social graph of the social-networking system based on the reward-generating event, wherein the social graph comprises a plurality of nodes and a plurality of edges connecting the nodes, each node corresponding to a user or content object associated with the social-networking system, wherein the first user corresponds to a first node of the plurality of nodes, and wherein updating the social graph comprises one or more of:
adding a new node to the social graph corresponding to a content object posted by the first user; or
adding an edge connecting the first node to a second node of the plurality of nodes corresponding to the content object liked, shared, or commented on by the first user;
search, by the server of the social-networking system, an event log of reward-generating events stored on the server to determine whether the update to the social graph matches a reward-generating rule defined by the social-networking system;
responsive to determining that the update to the social graph based on the reward-generating event performed by the first user matches the reward-generating rule, allocate, by the server of the social-networking system, a reward to an account associated with the first user, wherein the reward is calculated based on the reward-generating rule; and
responsive to determining that the update to the social graph based on the reward-generating event performed by the first user matches the reward-generating rule, send, to the client system of the first user, a selected advertisement for presentation to the first user, the selection of the advertisement being based at least in part on a quality score for the advertisement, wherein the quality score for the advertisement is calculated based on a value associated with the update to the social graph.

12. The media of claim 11, wherein the software is further operable when executed to:
select, by the server of the social-networking system, the advertisement for presentation to the first user further based at least in part on a bid for the advertisement by an advertiser, wherein:
the advertisement is associated with the provision of the information to the social-networking system;
the bid comprises a social-pay bid component comprising a value that the advertiser is willing to pay to the first user for the reward-generating event; and
the software is further operable when determining the reward to allocate to the first user for the reward-generating event to determine based at least in part on the action by the first user a portion of the social-pay bid component to allocate to the first user for the reward-generating event.

13. The media of claim 12, wherein:
the social-pay bid component further comprises a value that the advertiser is willing to pay to a carrier associated with the reward-generating event for the reward-generating event; and
the software is further operable when executed to determine, by the server of the social-networking system, based at least in part on the action by the first user a portion of the social-pay bid component to allocate to the carrier for the reward-generating event.

14. The media of claim 12, wherein:
the bid further comprises an advertisement bid component comprising a value that the advertiser is willing to pay to a publisher of the advertisement for the reward-generating event; and
the software is further operable when executed to determine, by the server of the social-networking system, based at least in part on the action by the first user a portion of the advertisement bid component to allocate to the publisher.

15. The media of claim 14, wherein all of the advertisement bid component is allocated to the publisher.

16. The media of claim 12, where the software is further configured when executed to determine, by the server of the social-networking system, based at least in part on the reward-generating event a portion of the social-pay bid component to allocate to another entity.

17. A social-networking system comprising: one or more processors of a server; and a memory coupled to the processors comprising instructions executable by the processors, the processors being operable when executing the instructions to:
- receive, from a client system of a first user of the social-networking system, an indication of a reward-generating event, wherein the reward-generating event comprises the first user liking, sharing, commenting on, or posting a content object via an interface associated with the social-networking system;
- update, by the server of the social-networking system, a social graph of the social-networking system based on the reward-generating event, wherein the social graph comprises a plurality of nodes and a plurality of edges connecting the nodes, each node corresponding to a user or content object associated with the social-networking system, wherein the first user corresponds to a first node of the plurality of nodes, and wherein updating the social graph comprises one or more of:
  - adding a new node to the social graph corresponding to a content object posted by the first user; or
  - adding an edge connecting the first node to a second node of the plurality of nodes corresponding to the content object liked, shared, or commented on by the first user;
- search, by the server of the social-networking system, an event log of reward-generating events stored on the server to determine whether the update to the social graph matches a reward-generating rule defined by the social-networking system;
- responsive to determining that the update to the social graph based on the reward-generating event performed by the first user matches the reward-generating rule, allocate, by the server of the social-networking system, a reward to an account associated with the first user, wherein the reward is calculated based on the reward-generating rule; and
- responsive to determining that the update to the social graph based on the reward-generating event performed by the first user matches the reward-generating rule, send, to the client system of the first user, a selected advertisement for presentation to the first user, the selection of the advertisement being based at least in part on a quality score for the advertisement, wherein the quality score for the advertisement is calculated based on a value associated with the update to the social graph.

* * * * *